(12) United States Patent
Choy et al.

(10) Patent No.: US 10,152,817 B2
(45) Date of Patent: Dec. 11, 2018

(54) ANIMATION AUTHORING SYSTEM AND METHOD FOR AUTHORING ANIMATION

(75) Inventors: Yoon Chul Choy, Seoul (KR); Jae Woong Jeon, Seoul (KR); Hyun Ho Jang, Seoul (KR)

(73) Assignee: Jae Woong Jeon, Seoul (KR)

( * ) Notice: Subject to any disclaimer, the term of this patent is extended or adjusted under 35 U.S.C. 154(b) by 323 days.

(21) Appl. No.: 13/695,409

(22) PCT Filed: Nov. 10, 2010

(86) PCT No.: PCT/KR2010/007926
§ 371 (c)(1),
(2), (4) Date: Feb. 7, 2013

(87) PCT Pub. No.: WO2011/149160
PCT Pub. Date: Dec. 1, 2011

(65) Prior Publication Data
US 2013/0135316 A1    May 30, 2013

(30) Foreign Application Priority Data

May 25, 2010   (KR) ........................ 10-2010-0048651
May 27, 2010   (KR) ........................ 10-2010-0049780

(51) Int. Cl.
*G06T 13/80*   (2011.01)
*G06T 13/20*   (2011.01)
(Continued)

(52) U.S. Cl.
CPC .......... *G06T 13/80* (2013.01); *G06F 3/04815* (2013.01); *G06F 3/04883* (2013.01); *G06T 13/20* (2013.01); *G06T 2213/08* (2013.01)

(58) Field of Classification Search
CPC ..... G06T 13/80; G06T 13/20; G06T 2213/08; G06F 3/04815; G06F 3/04883
See application file for complete search history.

(56) References Cited

U.S. PATENT DOCUMENTS

| 5,594,856 A * | 1/1997 | Girard ..................... G06T 13/40 345/473 |
| 6,373,492 B1 * | 4/2002 | Kroitor ................... G06T 13/00 345/443 |

(Continued)

OTHER PUBLICATIONS

Robert Rothfarb, Cosmo Worlds/World Building Tutorial—Grotto, http://www.hiddenline.com/wireframe/word/grotto/cosmoworlds-tutorial.html, 1998.*

*Primary Examiner* — Abderrahim Merouan
(74) *Attorney, Agent, or Firm* — Dinsmore & Shohl LLP; Yongsok Choi

(57) ABSTRACT

This invention relates to an animation authoring system and an animation authoring method, to enable beginners to produce a three-dimensional animation easily and to solve input ambiguity problem in the three-dimensional environment. The animation authoring method according to the invention comprises the steps of: (a) receiving a plane route of an object on a predetermined reference plane from a user; (b) creating a motion window formed along the plane route and having a predetermined angle to the reference plane to receive motion information of the object on the motion window from the user; and (c) implementing an animation according to the received motion information.

18 Claims, 11 Drawing Sheets

(51) Int. Cl.
*G06F 3/0481* (2013.01)
*G06F 3/0488* (2013.01)

(56) References Cited

U.S. PATENT DOCUMENTS

| | | | |
|---|---|---|---|
| 2006/0085767 A1* | 4/2006 | Hinckley | G06F 3/04842 |
| | | | 715/863 |
| 2008/0036772 A1* | 2/2008 | Bae | G06T 11/203 |
| | | | 345/442 |
| 2008/0222555 A1* | 9/2008 | Coyne | G06T 13/00 |
| | | | 715/781 |
| 2010/0134499 A1* | 6/2010 | Wang | G06T 13/80 |
| | | | 345/473 |

* cited by examiner

ANIMATION AUTHORING SYSTEM AND
METHOD FOR AUTHORING ANIMATION

PRIORITY

The present application claims priority under 35 U.S.C. § 371 to PCT Application PCT/KR2010/007926, filed on Nov. 10, 2010, which claims priority to Korean Patent Application No. 10-2010-0049780, filed on May 27, 2010, and to Korean Patent Application No. 10-2010-0048651, filed on May 25, 2010, the disclosures of which are hereby incorporated by reference in their entireties.

FIELD OF THE INVENTION

The present invention relates to an animation authoring system and a method for authoring animation, and more particularly, to an animation authoring system and a method for authoring animation which enables beginners to easily author a three-dimensional animation in which input ambiguity problems in three-dimensional environments have been solved.

BACKGROUND

Three-dimensional animations often appear in the movies or TV programs nowadays, and three-dimensional animation authoring tools are used for authoring such three-dimensional animations, but the conventional three-dimensional animation authoring tools are too complicated and difficult to use so that only persons of professional skill can use such tools.

Recently, due to the development of Internet and multimedia, general users who want to actively author and use three-dimensional animations rather than passively watch them are increasing.

Thus, non-professional tools to enable general users, including children and beginners, to author their own three-dimensional animations have been developed, and such non-professional tools create an animation of an object according to routes and motions simultaneously drawn on a screen by a user. However, accurate input of both the routes and motions is impossible and the motions that can be inputted are highly limited since both the routes and motions are simultaneously inputted.

Therefore, an animation authoring tool which enables non-professional users to easily author three-dimensional animations and to accurately input routes and motions of an object is increasingly needed.

SUMMARY OF THE INVENTION

The present invention is to solve the above prior art problems, and it is an objective of the present invention to provide an animation authoring system and a method for authoring animation which enables non-professional users, including children and beginners, to easily author three-dimensional animations and to accurately input routes and motions of an object.

The animation authoring method according to the first preferred embodiment of the present invention to achieve the above objective comprises the steps of: (a) receiving a plane route of an object on a predetermined reference plane from a user; (b) creating a motion window formed along the plane route and having a predetermined angle to the reference plane to receive motion information of the object on the motion window from the user; and (c) implementing an animation according to the received motion information.

The animation authoring system according to the first preferred embodiment of the present invention to achieve the above objective comprises: a plane route module to receive a plane route of an object on a predetermined reference plane from a user; a motion window module to create a motion window formed along the plane route and having a predetermined angle to the reference plane to receive motion information of the object on the motion window from the user; and an animation implementation unit to implement an animation according to the received motion information.

The animation authoring method according to the second preferred embodiment of the present invention to achieve the above objective comprises the steps of: (a) receiving a plane route of an object on a predetermined reference plane from a user; (b) creating a first motion window extended from the plane route and having a predetermined angle to the reference plane to receive a main route of the object on the first motion window from the user; (c) creating a plurality of second motion windows passing through the main route to receive a detailed route of the object on the second motion window from the user; and (d) implementing an animation according to the received detailed route.

The animation authoring system according to the second preferred embodiment of the present invention to achieve the above objective comprises: a plane route module to receive a plane route of an object on a predetermined reference plane from a user; a first motion window module to create a first motion window extended from the plane route and having a predetermined angle to the reference plane to receive a main route of the object on the first motion window from the user; a second motion window module to create a plurality of second motion windows passing through the main route to receive a detailed route of the object on the second motion window from the user; and an animation implementation unit to implement an animation according to the received detailed route.

The present invention employing the above structure and methodology has advantages in that non-professional users, including children and beginners, may easily author three-dimensional animations since a user may sketch routes and motions of an object with a simple input tool such as a tablet pen, a mouse, and a touch input device so as to input the information on the routes and motions.

The first preferred embodiment of the present invention employing the above structure and methodology has advantages in that routes and motions of an object may be accurately inputted since the motions of the object are inputted after the routes of the object are inputted.

The second preferred embodiment of the present invention employing the above structure and methodology has advantages in that the information on motions of an object may be accurately inputted since routes of the object are inputted via the reference plane, the first motion window, and the second motion window.

DETAILED DESCRIPTION OF THE INVENTION

Hereinafter, the animation authoring system and method according to the preferred embodiments of the invention will be described below in detail with reference to the accompanying drawings.

First Embodiment

First, the animation authoring system according to the first preferred embodiment of the invention will be described below with reference to FIGS. 1 to 2g.

Figure 1:
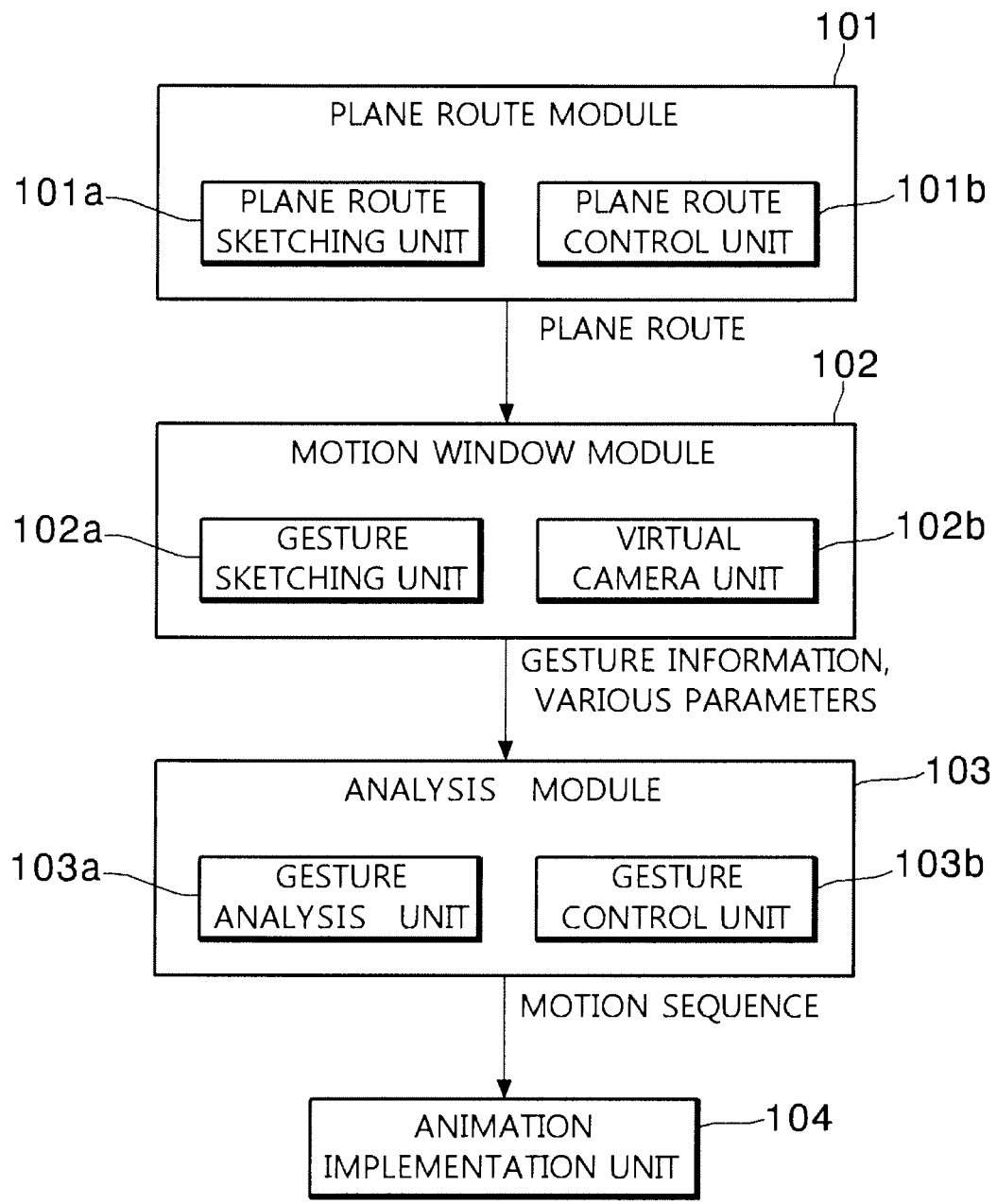
FIG. 1 is a block diagram illustrating an animation authoring system according to the first preferred embodiment of the present invention.

Referring to FIG. 1, the animation authoring system according to the first preferred embodiment of the invention comprises: a plane route module (101) to provide a first screen displaying a reference plane to a user and to receive a plane route of an object that the user draws on the reference plane; a motion window module (102) to provide a second screen displaying a motion window formed along the plane route to the user and to receive gesture data and parameters when the user draws a gesture for a motion of the object on the motion window; an analysis module (103) to convert the gesture data to the corresponding one of pre-stored motion data and then arrange the motion data together with the parameters in a temporal manner to create a motion sequence; and an animation implementation unit (104) to implement an animation according to the motion sequence.

Each element of a memory management module according to the first preferred embodiment of the invention employing the above structure will be described below in detail.

Referring to FIG. 1, the plane route module (101) comprises a plane route sketching unit (101a) and a plane route control unit (101b).

The plane route sketching unit (101a) of the plane route module (101) provides a first screen displaying a reference plane of a three-dimensional space to a user, and samples, approximates and stores a plane route of an object (e.g., a character having joints) drawn on the reference plane of the first screen by the user using an input tool such as a tablet pen, a mouse and a touch input device. At this time, a uniform cubic B-spline interpolation method may be employed in sampling and approximating the plane route, since such method has advantages in having local modification properties and affine invariance properties.

Figure 2A:
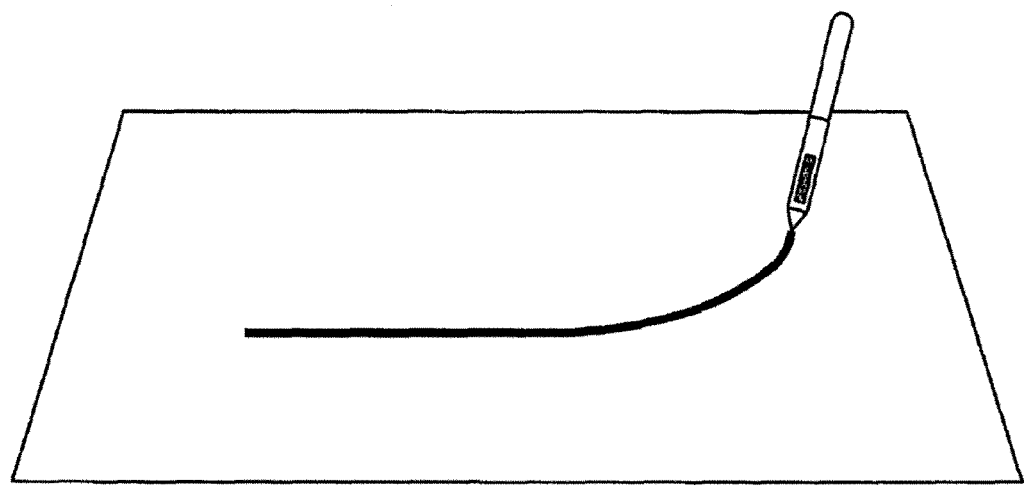
FIGS. 2a to 2g are diagrams illustrating the structure of the animation authoring system of FIG. 1.

FIG. 2a illustrates how the plane route of the object is drawn by the user using a tablet pen on the reference plane shown on the first screen provided by the plane route sketching unit (101a). The reference plane herein is a ground plane constructed by x- and y-axes, on the basis of the three-dimensional space including x-, y- and z-axes.

When the user inputs a revised route crossing the previously drawn plane route at least once, the plane route control unit (101b) of the plane route module (101) divides the revised route into multiple domains based on the crossing points, substitutes the longest one of the multiple domains for a part of the plane route, and discards the rest of the domains.

Referring to FIG. 1, the motion window module (102) comprises a gesture sketching unit (102a) and a virtual camera unit (102b).

The gesture sketching unit (102a) of the motion window module (102) creates a motion window along the plane route inputted via the plane route module (101) and provides the user with a second screen displaying the motion window using the virtual camera unit (102b), so that gesture data and parameters is inputted when the user draws a gesture for a motion of the object on the motion window using an input tool such as a tablet pen, a mouse and a touch input device.

The parameters herein may include the speed and height of the object, and the speed of the object corresponds to the speed of the user drawing the gesture and the height of the object corresponds to the height of the gesture drawn by the user. The basis of the height of the gesture is the plane route drawn by the user.

Figure 2B:
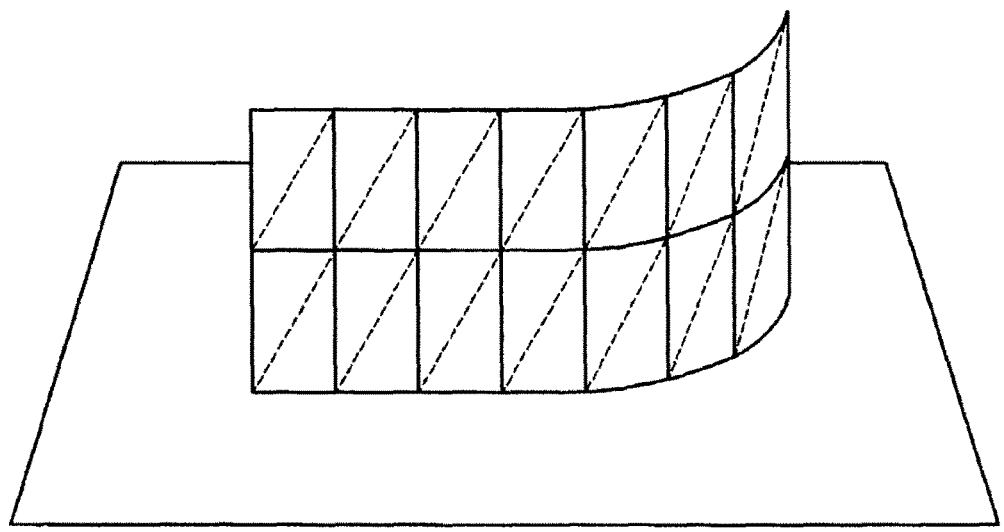

FIG. 2b shows the motion windows shown in the second screen provided by the gesture sketching unit of the motion window module (102).

The motion windows are surfaces which are vertically extended in an upward direction along the plane route sketched on the reference plane and formed with a predetermined vertical width.

FIG. 2b shows that the motion windows are perpendicular to the reference plane and the plane route. However, it is for illustrative purpose and shall not be construed to limit the present invention thereto. The motion windows may have a predetermined angle instead of being perpendicular to the reference plane and the plane route.

The gesture sketching unit (102a) of the motion window module (102) may receive gesture data for various motions including moving motions (e.g., walking motions, running motions, jumping motions, etc.) and standing motions (e.g., greeting motions, saluting motions, etc.) when receiving the gesture data for the motions of the object from the user.

Figure 2C:
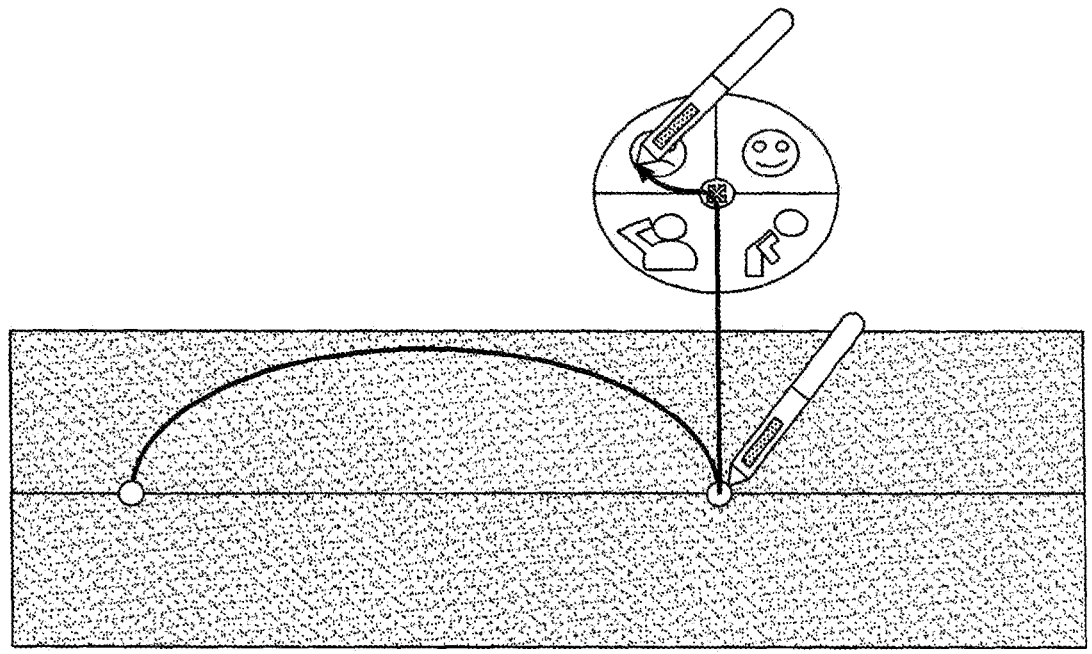

FIG. 2c shows a second screen shown to the user when the gesture sketching unit (102a) receives gesture data for standing motions of the object from the user.

Referring to FIG. 2c, when the user stays for a predetermined time after drawing a line upward in a direction corresponding to the z-axis in the three-dimensional space while sketching a gesture, the gesture sketching unit (102a) shows a standing motion selection menu to the user so that the user may select/input one of the standing motions.

The virtual camera unit (102b) of the motion window module (102) comprises a virtual camera which moves along the moving directions of the gestures, maintaining a distance to the motion windows, and records the motion windows and the gestures sketched by the user so that they may be displayed on the second screen for the user.

Figure 2D:
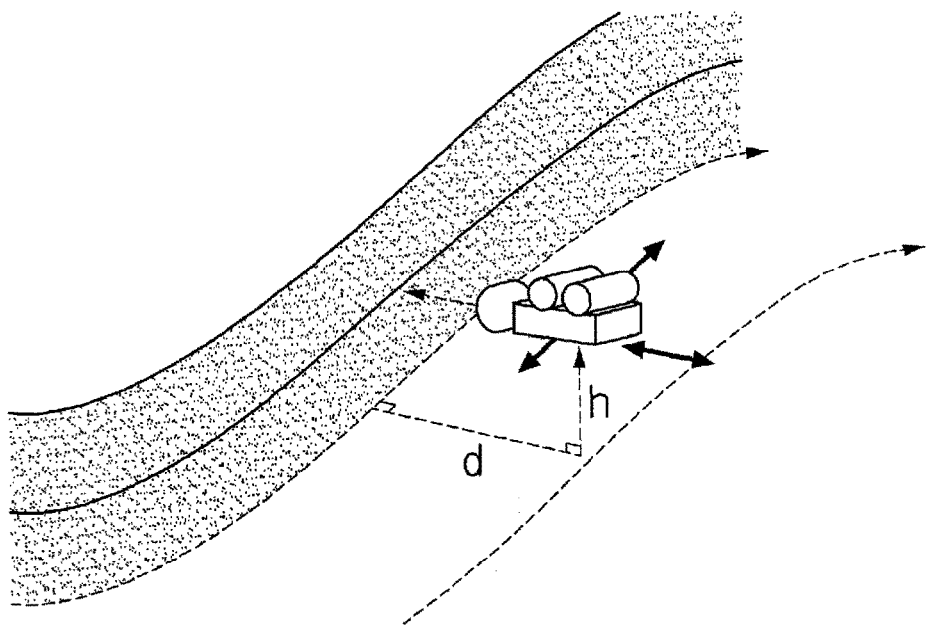

FIG. 2d shows how the virtual camera moves along the motion windows as shown in FIG. 2b.

Referring to FIG. 2d, the virtual camera is positioned at a height h corresponding to the half of the vertical width of the motion windows with a predetermined distance d to the motion windows, and provides the recorded images of the motion windows to the user via the second screen. Here, a Catmull-Rom spline interpolation method may be employed in displaying via the second screen the images of the motion windows recorded by the virtual camera, and the Catmull-Rom spline interpolation method has advantages in that a screen on which a user may easily sketch gestures can be shown to the user since the Catmull-Rom spline passes the control points on the motion windows.

Figure 2E:
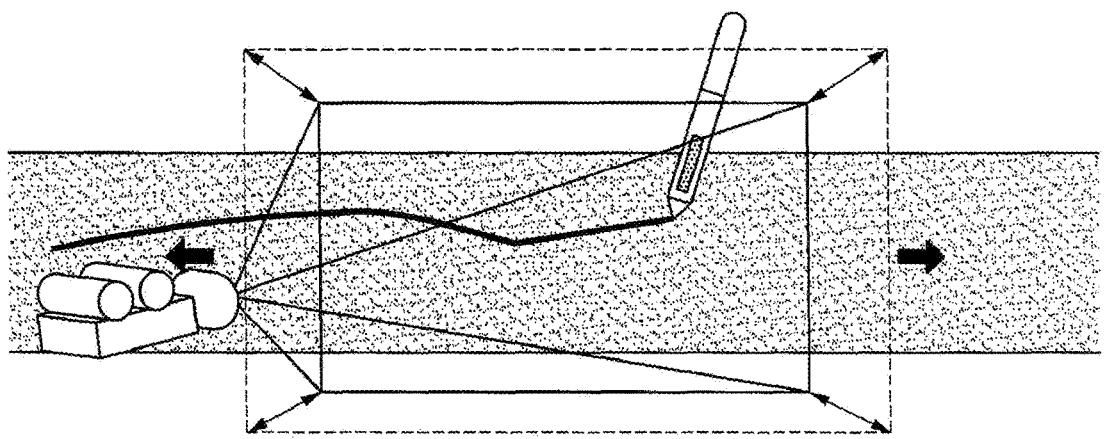

FIG. 2e shows an example in which the virtual camera zooms out when the gestures drawn by the user get out of the motion windows and another example in which the virtual camera scrolls to the left or right when the user sketches the gestures in a predetermined direction and then in an opposite direction.

Referring to FIG. 2e, the virtual camera provides the user via the second screen with a domain corresponding to the solid line rectangular, that is, a domain corresponding to the vertical width of the motion windows when the gestures drawn by the user are within the motion windows, whereas it zooms out and provides the user via the second screen with a domain corresponding to the dotted line rectangular, that is, a domain longer than the vertical width of the motion windows when the gestures drawn by the user get out of the motion windows.

Referring further to FIG. 2e, when the user sketches the gestures in a predetermined direction (e.g., to the right in FIG. 2e) and then in an opposite direction (e.g., to the left in FIG. 2e), the virtual camera moves along the moving directions of the gestures sketched by the user and provides the user with the recorded images of the motion windows via the second screen by scrolling to a direction corresponding to the opposite direction (e.g., to the left in FIG. 2e).

When the virtual camera moves along the moving directions of the gestures, maintaining a distance to the motion windows, it checks the moving distance of the virtual camera relative to a predetermined length of the motion windows and determines the corresponding domain to be bent if the moving distance of the virtual camera is longer than a predetermined threshold so that it moves along the shortest route instead of following the motion windows.

Figure 2F:
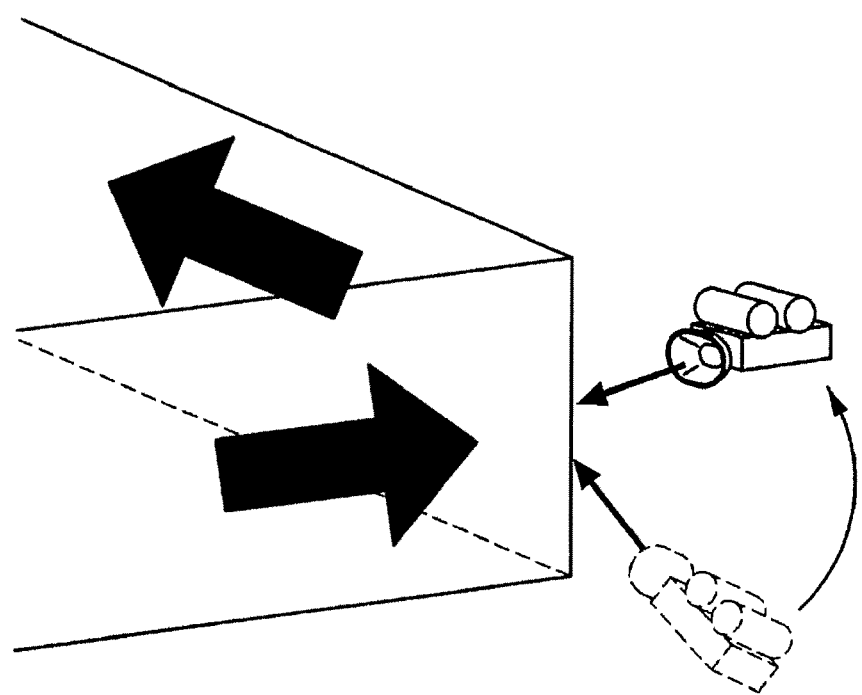
Figure 2F:
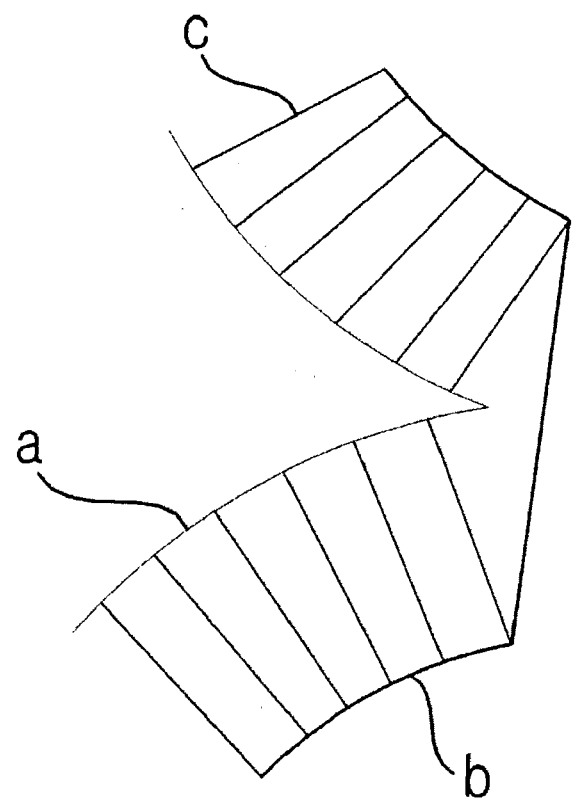
Figure 2G:
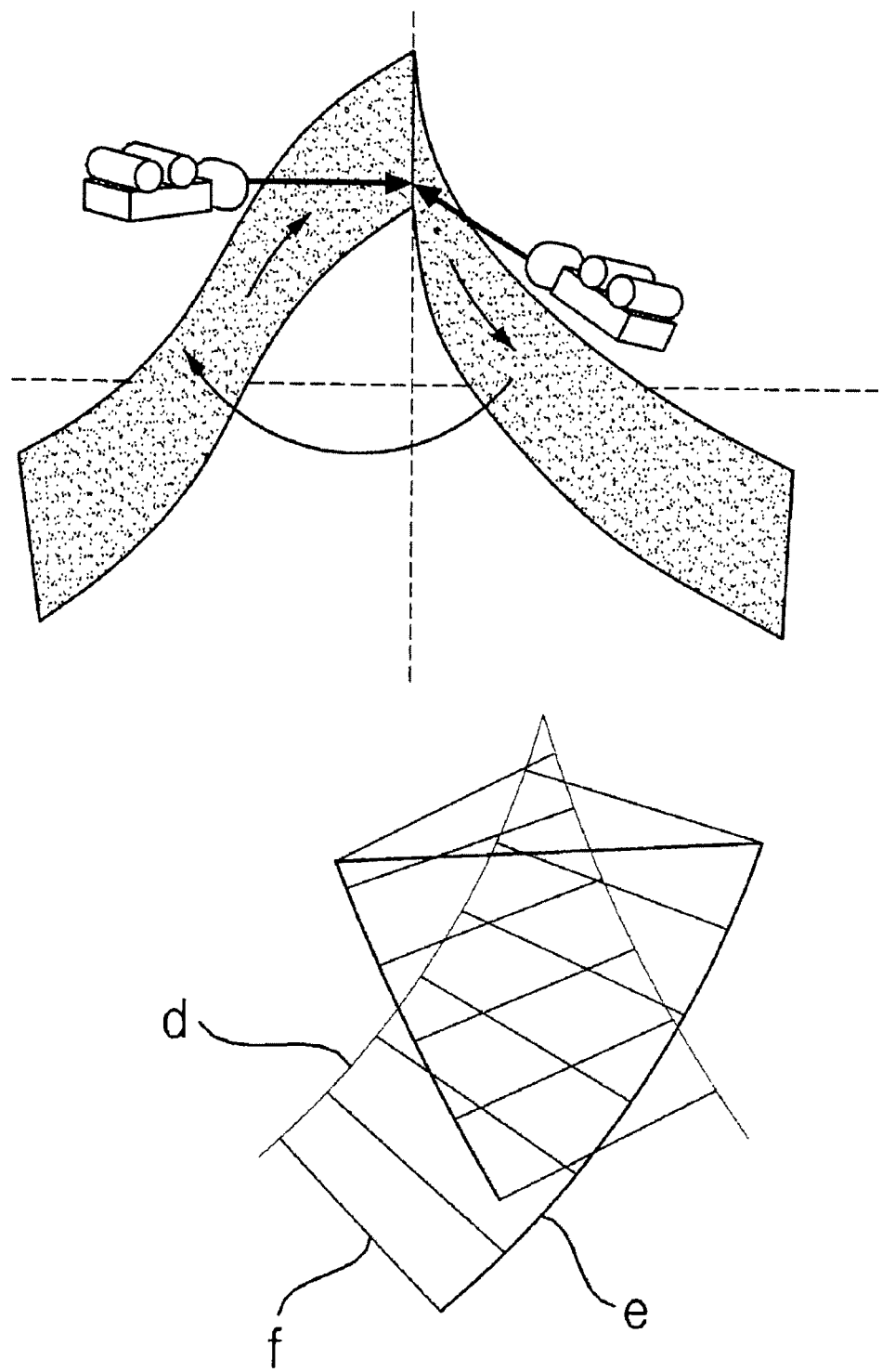

In the upper parts of FIGS. 2f and 2g, examples are shown wherein the motion windows have a domain bent at a predetermined angle, and in the lower parts of FIGS. 2f and 2g, examples of the bent domains (a, d), the moving routes of the virtual camera (b, e) and the camera offset segments (c, f) are shown when the motion windows have a domain bent at a predetermined angle. FIG. 2f shows an example wherein the virtual camera moves along the outside of the bent domain (referred to as "outside turn") when the motion windows have a domain bent at a predetermined angle, and FIG. 2g shows an example wherein the virtual camera moves along the inside of the bent domain (referred to as "inside turn") when the motion windows have a domain bent at a predetermined angle.

Referring to FIG. 2f, when the two camera offset segments (c) do not cross and the moving distance of the virtual camera ($l_i$) is longer than a first threshold ($l_1$), the virtual camera is determined to be moving along the outside of the bent domain of the motion windows, and moves along the shortest route instead of following the motion windows to get out of the bent domain.

Referring to FIG. 2g, when the two camera offset segments (c) cross and the moving distance of the virtual camera ($l_i$) is longer than a second threshold ($l_2$), the virtual camera is determined to be moving along the inside of the bent domain of the motion windows, and moves along the shortest route instead of following the motion windows to get out of the bent domain. Here, the first threshold ($l_1$) is larger than the second threshold ($l_2$).

When the virtual camera is determined to be moving along the outside or the inside of the bent domain, the motion window module (102) indicates the position of the gesture being currently sketched by the user with a pause mark and saves the current sketch status including the sketch speed, and after the virtual camera moves via the shortest route to get out of the bent domain, the motion window module (102) enables the user to resume sketching in the previously saved sketch status from the position indicated with the pause mark.

Referring to FIG. 1, the analysis module (103) comprises a gesture analysis unit (103a) and a gesture control unit (103b).

The gesture analysis unit (103a) of the analysis module (103) receives gesture data and parameters from the motion window module (102), partitions the gesture data (in which the unit of partition is a single gesture), and then converts each of the partitioned gesture data into the corresponding one of pre-stored motion data to create a motion sequence by arranging the motion data together with the parameters in a temporal manner. The analysis module (103a) may use a corner detection algorithm in converting the gesture data into the corresponding one of the pre-stored motion data.

The pre-stored motion data include multiple possible motions of the object, and if the gesture data corresponding to the motion data for similar motions are similar, the user may sketch gestures more easily through the gesture sketching unit (102a) of the motion window module (102).

When incorporating the parameters into the motion sequence, the gesture analysis unit (103a) of the analysis module (103) may make the change curve of the speed parameter more gradual during a predetermined period corresponding to the boundaries between the motion data so that a more natural motion of the object may be created when the animation is implemented later.

When there are any gesture data that cannot be recognized in the animation authoring system of the present invention among the gesture data inputted by the user, the gesture control unit (103b) of the analysis module (103) substitutes gesture data corresponding to pre-stored basic motions for the unrecognizable data.

That is, the gesture control unit (103b) determines whether each of the gesture data from the gesture analysis unit (103a) does not correspond to at least one of the pre-stored motion data and thus is unrecognizable, and if there are any gesture data that are determined to be unrecognizable, substitutes the gesture data corresponding to the pre-stored basic motions for the unrecognizable data and then output them to the gesture analysis unit (103a).

Referring to FIG. 1, the animation implementation unit (104) implements a three-dimensional animation using the motion sequence received from the analysis module (103).

Figure 3:
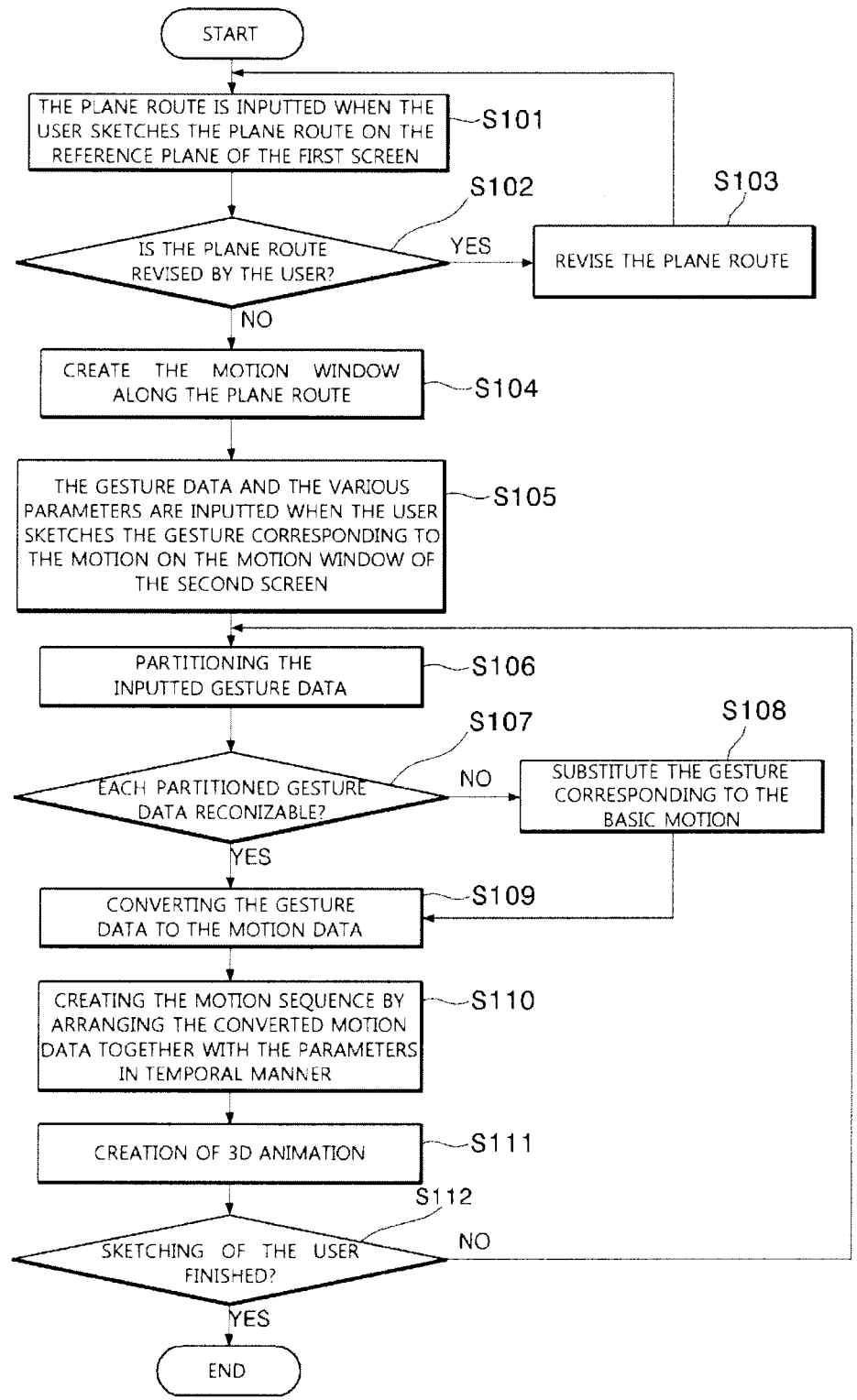
FIG. 3 is a block diagram illustrating an animation authoring method according to the first preferred embodiment of the present invention.

Hereafter, the animation authoring method according to the first preferred embodiment of the present invention will be described with reference to FIG. 3.

First, the plane route module (101) provides a first screen displaying a reference plane to a user, and samples, approximates and stores a plane route of an object sketched on the reference plane of the first screen by the user using an input tool such as a tablet pen, a mouse and a touch input device (S101). At this time, a uniform cubic B-spline interpolation method may be employed in sampling and approximating the plane route.

Then, the plane route module (101) determines whether the user inputs a revised route crossing the previously drawn plane route at least once (S102), and if a revised route is determined to be inputted, divides the revised route into multiple domains based on the crossing points and substitutes the longest one of the multiple domains for a part of the plane route (S103).

Next, the motion window module (102) creates a motion window along the plane route inputted via the plane route module (101) and provides the user with a second screen displaying the motion window using a virtual camera, so that gesture data and parameters are inputted when the user sketches a gesture for a motion of the object on the motion window using an input tool such as a tablet pen, a mouse and a touch input device (S105).

The motion window herein may have a predetermined angle instead of being perpendicular to the reference plane and the plane route.

The parameters herein may include the speed and height of the object, and the speed of the object corresponds to the speed of the user drawing the gesture and the height of the object corresponds to the height of the gesture drawn by the user.

The motion window module (102) may receive gesture data for various motions including moving motions (e.g., walking motions, running motions, jumping motions, etc.) and standing motions (e.g., greeting motions, saluting motions, etc.) when receiving the gesture data for the motions of the object from the user. When the user stays for a predetermined time after drawing a line upward in a direction corresponding to the z-axis in the three-dimensional space while sketching a gesture, the motion window module shows a standing motion selection menu to the user so that the user may select/input one of the standing motions.

The virtual camera moves along the moving directions of the gestures, maintaining a distance to the plane route, and records the motion windows and the gestures sketched by the user so that they may be displayed on the second screen for the user.

The virtual camera is positioned at a height corresponding to the half of the vertical width of the motion windows with a predetermined distance to the motion windows, and provides the recorded image of the motion windows to the user via the second screen. Here, a Catmull-Rom spline interpolation method may be employed in displaying via the second screen the images of the motion windows recorded by the virtual camera.

The virtual camera provides the user via the second screen with a domain corresponding to the vertical width of the motion windows when the gestures sketched by the user are within the motion windows, whereas it zooms out and provides the user via the second screen with a domain longer than the vertical width of the motion windows when the gestures drawn by the user get out of the motion windows.

And, when the user sketches the gestures in a predetermined direction and then in an opposite direction, the virtual camera moves along the moving directions of the gestures sketched by the user and provides the user with the recorded images of the motion windows via the second screen by scrolling to a direction corresponding to the opposite direction.

When the virtual camera moves along the moving directions of the gestures, maintaining a distance to the motion windows, it checks the moving distance of the virtual camera relative to a predetermined length of the motion windows and determines the corresponding domain to be bent if the moving distance of the virtual camera is longer than a predetermined threshold so that it moves along the shortest route instead of following the motion windows. The detailed description thereon can be found in the above description on the animation authoring system according to the first preferred embodiment of the present invention with reference to FIGS. 2f and 2g.

When the virtual camera is determined to be moving along the bent domain, the motion window module indicates the position of the gesture being currently sketched by the user with a pause mark and saves the current sketch status including the sketch speed, and after the virtual camera moves via the shortest route to get out of the bent domain, the motion window module enables the user to resume sketching in the previously saved sketch status from the position indicated with the pause mark.

Then, the analysis module (103) partitions gesture data received from the motion window module (in which the unit of partition is a single gesture) (S106).

Next, the analysis module (103) determines whether each of the partitioned gesture data does not correspond to at least one of pre-stored motion data and thus is unrecognizable (S107).

Then, if there are any partitioned gesture data that are determined to be unrecognizable since they do not correspond to at least one of the pre-stored motion data, the analysis module (103) substitutes gesture data corresponding to pre-stored basic motions for the unrecognizable data (S108), whereas it proceeds to the next step (S109) if each of the partitioned gesture data is determined to be recognizable.

Next, the analysis module (103) converts each of the gesture data into the corresponding one of pre-stored motion data to create a motion sequence by arranging the motion data together with the parameters from the motion window module in a temporal manner (S110). The analysis module (103) may use a corner detection algorithm in converting the gesture data into the corresponding one of the pre-stored motion data.

When incorporating the parameters into the motion sequence, the analysis module (103) may make the change curve of the speed parameter more gradual during a predetermined period corresponding to the boundaries between the motion data so that a more natural motion of the object may be created when the animation is implemented later.

Then, the animation implementation unit (104) implements a three-dimensional animation using the motion sequence received from the analysis module (103) (S111).

Next, the motion window module (103) determines whether the user completed the sketch of the gestures for the motions of the object (S112), and terminates the animation authoring if the sketch is determined to be completed, whereas the above-mentioned step of partitioning the gesture data received from the motion window module (103) (S106) and the following steps are repeated if the sketch is determined to be incomplete.

Second Embodiment

Hereinafter, the animation authoring system and method according to the second preferred embodiment of the present invention will be described in detail with reference to the accompanying drawings.

First, referring to FIG. 4 to FIG. 5b, the animation authoring system according to the second preferred embodiment of the invention will be described below. In describing the animation authoring system according to the second preferred embodiment of the invention, reference can be made to FIGS. 2a, 2b, and 2d to 2g, which are related to the animation authoring system according to the first embodiment of the invention.

Figure 4:
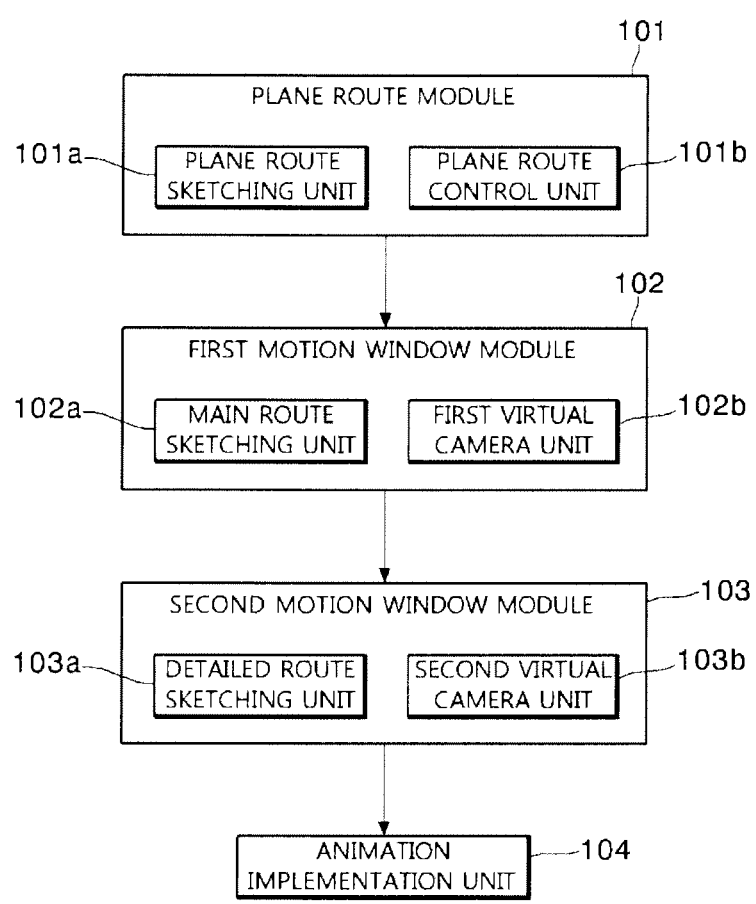
FIG. 4 is a block diagram illustrating an animation authoring system according to the second preferred embodiment of the present invention.

Referring to FIG. 4, the animation authoring system according to the preferred embodiment of the present invention comprises: a plane route module (101) to receive a plane route of an object on a predetermined reference plane from a user; a first motion window module (102) to create a first motion window extended from the plane route and having a predetermined angle to the reference plane to receive a main route of the object on the first motion window from the user; a second motion window module (103) to create a plurality of second motion windows passing through the main route to receive a detailed route of the object on the second motion window from the user; and an animation implementation unit (104) to implement an animation according to the received detailed route.

Each element of a memory management module according to the second preferred embodiment of the invention employing the above structure will be described below in detail.

Referring to FIG. 4, the plane route module (101) comprises a plane route sketching unit (101a) and a plane route control unit (101b).

The plane route sketching unit (101a) of the plane route module (101) provides a first screen displaying a reference plane of a three-dimensional space to a user, and samples, approximates and stores a plane route of an object (e.g., an object without joints such as an airplane, etc.) drawn on the reference plane of the first screen by the user using an input tool such as a tablet pen, a mouse and a touch input device. At this time, a uniform cubic B-spline interpolation method may be employed in sampling and approximating the plane route, since such method has advantages in having local modification properties and affine invariance properties.

FIG. 2a illustrates how the plane route of the object is drawn by the user using a tablet pen on the reference plane shown on the first screen provided by the plane route sketching unit (101a). The reference plane herein is a ground plane constructed by x- and y-axes, on the basis of the three-dimensional space including x-, y- and z-axes.

When the user inputs a revised route crossing the previously drawn plane route at least once, the plane route control unit (101b) of the plane route module (101) divides the revised route into multiple domains based on the crossing points, substitutes the longest one of the multiple domains for a part of the plane route, and discards the rest of the domains.

Referring to FIG. 4, the first motion window module (102) comprises a main route sketching unit (102a) and a first virtual camera unit (102b).

The main route sketching unit (102a) of the first motion window module (102) creates a first motion window along the plane route inputted via the plane route module (101) and provides the user with a second screen displaying the motion window using the first virtual camera unit (102b), so that information on the main route and the speed of the object is inputted when the user sketches the main route of the object on the first motion window using an input tool such as a tablet pen, a mouse and a touch input device. The speed information herein corresponds to the speed of the user drawing the main route.

In describing the present invention, an object without joints such as an airplane is exemplified as an object to be animated, but the invention is not limited thereto. The object to be animated may be an object with joints as long as it falls within the scope of the invention, and in case of an object having joints, the main route sketching unit (102a) of the first motion window module (102) may receive information on the main route and the speed of the object as well as information on the gesture and the height of the object from the user.

FIG. 2b shows the first motion windows shown in the second screen provided by the main route sketching unit (102a) of the first motion window module (102).

The first motion windows are surfaces which are vertically extended in an upward direction perpendicular to the plane route sketched on the reference plane and formed with a predetermined vertical width.

FIG. 2b shows that the first motion windows are perpendicular to the reference plane and the plane route. However, it is for illustrative purpose and shall not be construed to limit the present invention thereto. The first motion windows may have a predetermined angle instead of being perpendicular to the reference plane and the plane route as necessary.

The first virtual camera unit (102b) of the first motion window module (102) comprises a first virtual camera which moves along the moving direction of the main route, maintaining a distance to the motion windows, and records the first motion windows and the main route sketched by the user so that they may be displayed on the second screen for the user.

FIG. 2d shows how the first virtual camera moves along the first motion windows as shown in FIG. 2b.

Referring to FIG. 2d, the first virtual camera is positioned at a height h corresponding to the half of the vertical width of the first motion windows with a predetermined distance d to the first motion windows, and provides the recorded images of the first motion windows to the user via the second screen. Here, a Catmull-Rom spline interpolation method may be employed in displaying via the second screen the images of the first motion windows recorded by the first virtual camera, and the Catmull-Rom spline interpolation method has advantages in that a screen on which a user may easily sketch the main route can be shown to the user since the Catmull-Rom spline passes the control points on the first motion windows.

FIG. 2e shows an example in which the first virtual camera zooms out when the main route drawn by the user gets out of the first motion windows and another example in which the first virtual camera scrolls to the left or right when the user sketches the main route in a predetermined direction and then in an opposite direction.

Referring to FIG. 2e, the first virtual camera provides the user via the second screen with a domain corresponding to the solid line rectangular, that is, a domain corresponding to the vertical width of the first motion windows when the main route drawn by the user is within the first motion windows, whereas it zooms out and provides the user via the second screen with a domain corresponding to the dotted line rectangular, that is, a domain longer than the vertical width of the first motion windows when the main route drawn by the user gets out of the first motion windows.

Referring further to FIG. 2e, when the user sketches the main route in a predetermined direction (e.g., to the right in FIG. 2e) and then in an opposite direction (e.g., to the left in FIG. 2e), the first virtual camera moves along the moving direction of the main route sketched by the user and provides the user with the recorded images of the first motion windows via the second screen by scrolling to a direction corresponding to the opposite direction (e.g., to the left in FIG. 2e).

When the first virtual camera moves along the moving direction of the main route, maintaining a distance to the first motion windows, it checks the moving distance of the first virtual camera relative to a predetermined length of the first motion windows and determines the corresponding domain to be bent if the moving distance of the first virtual camera is longer than a predetermined threshold so that it moves along the shortest route instead of following the first motion windows.

In the upper parts of FIGS. 2*f* and 2*g*, examples are shown wherein the first motion windows have a domain bent at a predetermined angle, and in the lower parts of FIGS. 2*f* and 2*g*, examples of the bent domains (a, d), the moving routes of the virtual camera (b, e) and the camera offset segments (c, f) are shown when the first motion windows have a domain bent at a predetermined angle. FIG. 2*f* shows an example wherein the first virtual camera moves along the outside of the bent domain (referred to as "outside turn") when the first motion windows have a domain bent at a predetermined angle, and FIG. 2*g* shows an example wherein the first virtual camera moves along the inside of the bent domain (referred to as "inside turn") when the first motion window have a domain bent at a predetermined angle.

Referring to FIG. 2*f*, when the two camera offset segments (c) do not cross and the moving distance of the virtual camera ($l_i$) is longer than a first threshold ($l_1$), the first virtual camera is determined to be moving along the outside of the bent domain of the first motion windows, moves along the shortest route instead of following the first motion windows to get out of the bent domain.

Referring to FIG. 2*g*, when the two camera offset segments (c) cross and the moving distance of the virtual camera ($l_i$) is longer than a second threshold ($l_2$), the first virtual camera is determined to be moving along the inside of the bent domain of the first motion windows, and moves along the shortest route instead of following the first motion windows to get out of the bent domain. Here, the first threshold ($l_1$) is larger than the second threshold ($l_2$).

When the first virtual camera is determined to be moving along the outside or the inside of the bent domain, the first motion window module (102) indicates the position of the main route being currently sketched by the user with a pause mark and saves the current sketch status including the sketch speed, and after the first virtual camera moves via the shortest route to get out of the bent domain, the first motion window module (102) enables the user to resume sketching in the previously saved sketch status from the position indicated with the pause mark.

Referring to FIG. 4, the second motion window module (103) comprises a detailed route sketching unit (103*a*) and a second virtual camera unit (103*b*).

The detailed route sketching unit (103*a*) of the second motion window module (103) successively creates a plurality of second motion windows passing through the main route at the center thereof with an interval therebetween and provides the user with the third screen displaying the second motion windows via the second virtual camera unit (103*b*), so that a detailed route of the object is inputted, approximated and stored when the user sketches the detailed route of the object on the second motion windows using an input tool such as a tablet pen, a mouse and a touch input device. At this time, a uniform cubic B-spline interpolation method may be employed in sampling and approximating the detailed route.

The intervals between the plurality of the second motion windows created in the detailed route sketching unit (103*a*) are determined by the speed information inputted via the first motion window module (102).

That is, the detailed route sketching unit (103*a*) of the second motion window module (103) displays the second motion windows on the third screen with a relatively large interval therebetween in the domains corresponding to high speeds in the main route inputted via the first motion window module (102), and displays the second motion windows on the third screen with a relatively short interval therebetween in the domains corresponding to low speeds.

The detailed route of the object sketched on the second motion windows means a detailed movement when the object makes such detailed movement (e.g., a spiral movement) around the main route while the object is moving along the main route.

In describing the present invention, an object without joints such as an airplane is exemplified as an object to be animated, but the invention is not limited thereto. The object to be animated may be an object with joints as long as it falls within the scope of the invention, and in case of an object having joints, the detailed route sketching unit (103*a*) of the second motion window module (103) may receive information on the detailed route and the speed of the object as well as information on the gesture and the height of the object from the user.

Figure 5A:
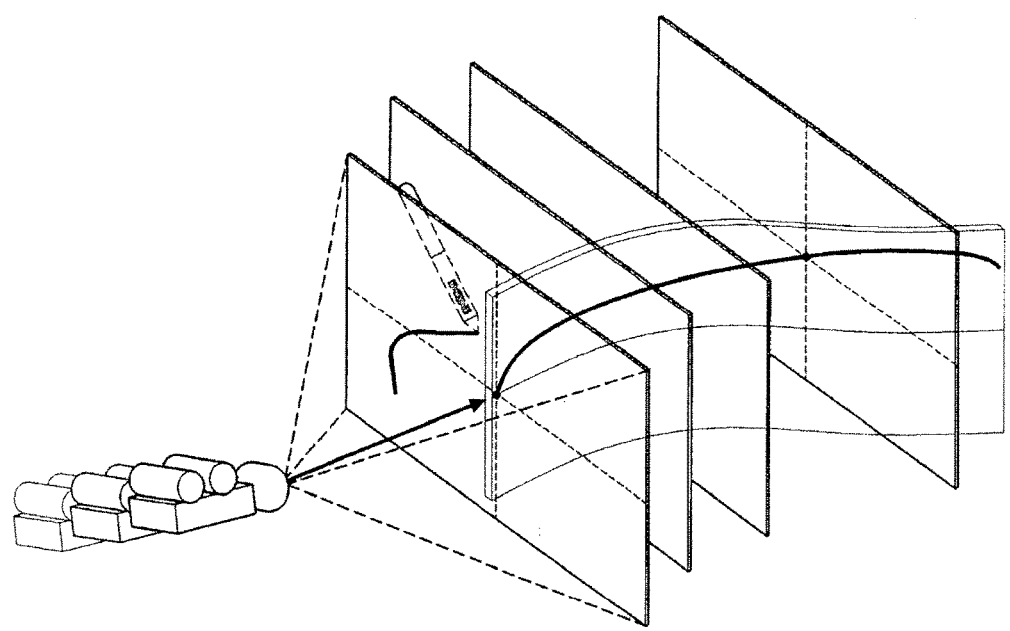
FIGS. 5a and 5b are diagrams illustrating the structure of the animation authoring system of FIG. 4.

FIG. 5*a* shows examples of the second motion windows successively created with an interval therebetween in the detailed route sketching unit (103*a*) of the second motion window module (103), and also shows how the second virtual camera records the images of the second motion windows, moving forward (or backward) as the second motion windows are created.

If the first motion windows formed along the plane route are heavily bent so that some domains of the second motion windows are overlapped, a problem may arise as the detailed route sketched on the second motion windows may be recognized as an undesirable reverse movement. In order to demonstrate a solution to the problem carried out in the second motion window module (103), FIG. 5*b* shows a plane view illustrating the second motion windows from (+) direction toward (−) direction of the z-axis in FIG. 5*a* for illustrative purpose.

Figure 5B:
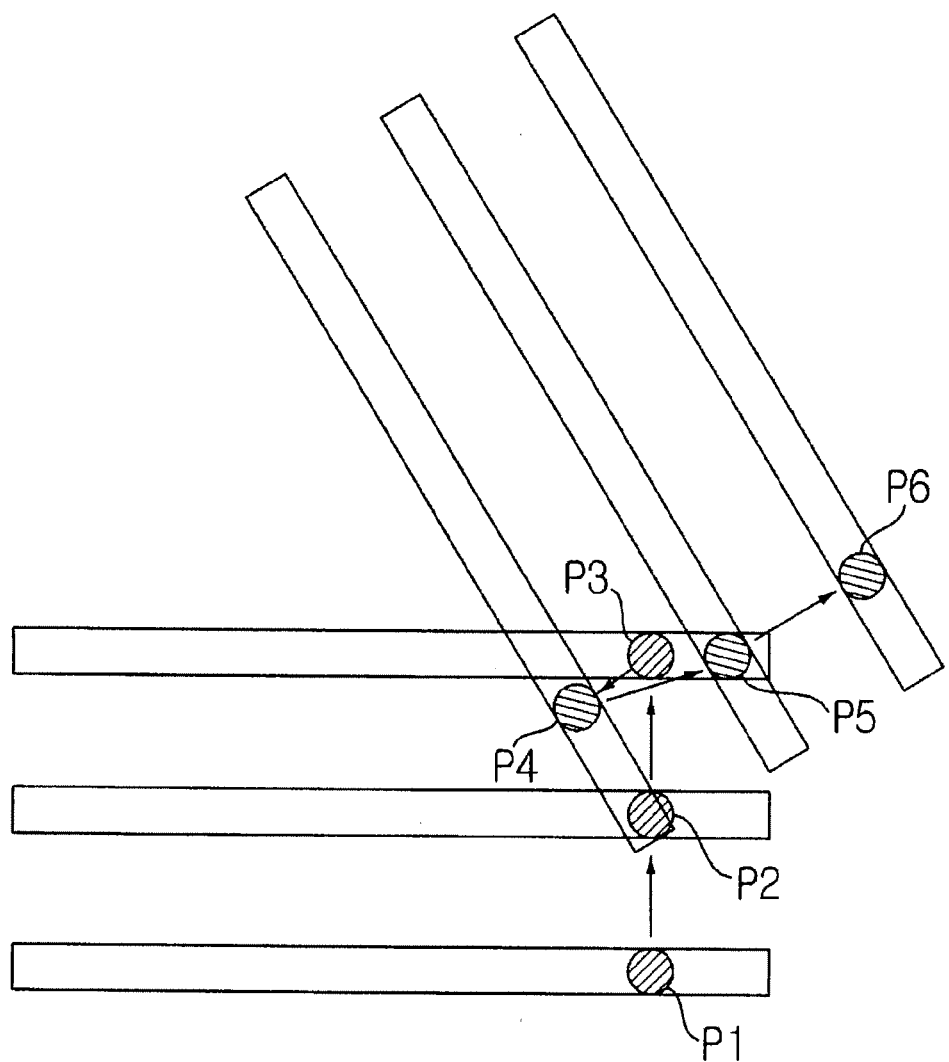

Referring to FIG. 5*b*, if the first motion windows formed along the plane route are heavily bent so that some domains of the second motion windows are overlapped, the detailed route sketching unit (103*a*) of the second motion window module (103) may recognize the detailed route as a reverse movement against the intent of the user when the user sketches the detailed route in the overlapping domains. In order to solve this problem, the detailed route sketching unit (103*a*) monitors for every detailed route sketched on the second motion windows (e.g., P1 to P6 in FIG. 5*h*) the tangent values between the detailed routes sketched on a predetermined number of the previous and subsequent successive second motion windows. When an undesirable reverse movement is detected, the detailed route causing the reverse movement (e.g., P4 in FIG. 5*h*) is ignored (deleted). Hereby, a problem such as an abnormal movement of the object against the intent of the user may not arise when a three-dimensional animation of the object is implemented later.

Referring to FIG. 4, the animation implementation unit (104) performs a beautification process on a three-dimensional route according to the detailed routes received from the above-mentioned second motion window module (103) and then implements an animation according to the beautified three-dimensional route.

When the above object is an object with joints, the detailed routes received from the second motion window module (103) as well as the information on the gesture and the height received from the first motion window module (102) or the second motion window module (103) are applied in implementing the animation.

Figure 6:
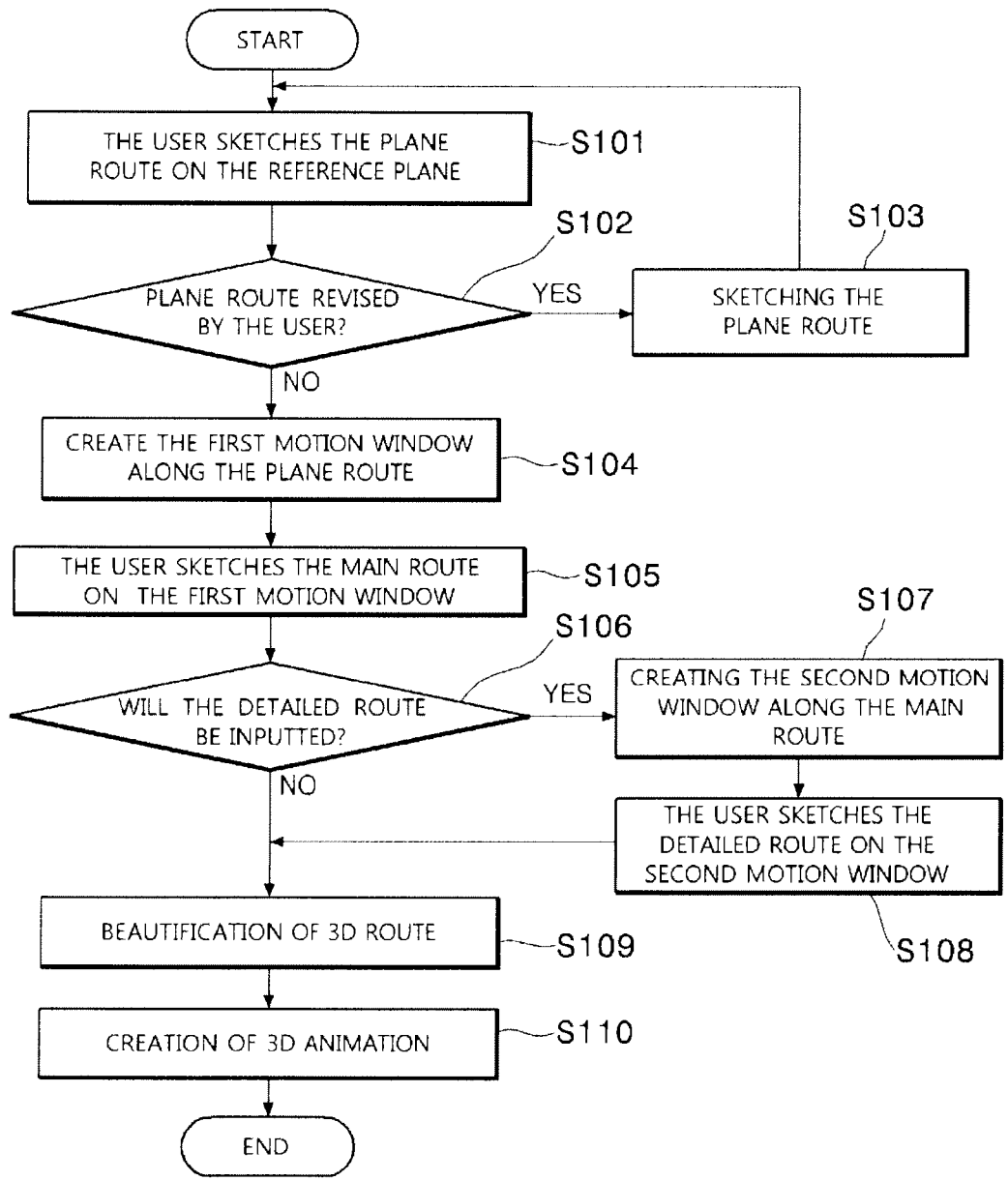
FIG. 6 is a block diagram illustrating an animation authoring method according to the second preferred embodiment of the present invention.

Hereafter, the animation authoring method according to the second preferred embodiment of the present invention will be described with reference to FIG. 6.

First, the plane route module (101) provides a first screen displaying a reference plane to a user, and samples, approximates and stores a plane route of the object (e.g., an object without joints such as an airplane, etc.) sketched on the reference plane of the first screen by the user using an input tool such as a tablet pen, a mouse and a touch input device (S101). At this time, a uniform cubic B-spline interpolation method may be employed in sampling and approximating the plane route.

Then, the plane route module (101) determines whether the user inputs a revised route crossing the previously drawn plane route at least once (S102), and if a revised route is determined to be inputted, divides the revised route into multiple domains based on the crossing points and substitutes the longest one of the multiple domains for a part of the plane route (S103).

Next, the first motion window module (102) creates a first motion window along the plane route inputted via the plane route module (101) and provides the user with a second screen displaying the first motion window using a first virtual camera, so that information on the main route and the speed of the object are inputted when the user sketches the main route of the object on the first motion window using an input tool such as a tablet pen, a mouse and a touch input device (S105). The speed information herein corresponds to the speed of the user drawing the main route.

In describing the present invention, an object without joints such as an airplane is exemplified as an object to be animated, but the invention is not limited thereto. The object to be animated may be an object with joints as long as it falls within the scope of the invention, and in case of an object having joints, the main route sketching unit (102a) of the first motion window module (102) may receive information on the main route and the speed of the object as well as information on the gesture and the height of the object from the user.

The first motion windows may be perpendicular to or have a predetermined angle instead of being perpendicular to the reference plane and the plane route.

And, the first virtual camera moves along the moving direction of the main route, maintaining a distance to the plain route, and records the first motion windows and the main route sketched by the user so that they may be displayed on the second screen for the user.

The first virtual camera is positioned at a height corresponding to the half of the vertical width of the first motion windows with a predetermined distance d to the first motion windows, and provides the recorded images of the first motion windows to the user via the second screen. Here, a Catmull-Rom spline interpolation method may be employed in displaying via the second screen the images of the first motion windows recorded by the first virtual camera.

The first virtual camera provides the user via the second screen with a domain corresponding to the vertical width of the first motion windows when the main route sketched by the user is within the first motion windows, whereas it zooms out and provides the user via the second screen with a domain longer than the vertical width of the first motion windows when the main route drawn by the user gets out of the first motion windows.

When the user sketches the main route in a predetermined direction and then in an opposite direction, the first virtual camera moves along the moving direction of the main route sketched by the user and provides the user with the recorded images of the first motion windows via the second screen by scrolling to a direction corresponding to the opposite direction.

When the first virtual camera moves along the moving direction of the main route, maintaining a distance to the first motion windows, it checks the moving distance of the first virtual camera relative to a predetermined length of the first motion windows and determines the corresponding domain to be bent if the moving distance of the first virtual camera is longer than a predetermined threshold, so that it moves along the shortest route instead of following the first motion windows. The detailed description thereon can be found in the above description on the animation authoring system according to the embodiments of the invention with reference to FIGS. 2$f$ and 2$g$.

When the first virtual camera is determined to be moving along the bent domain of the first motion windows, the first motion window module indicates the position of the main route being currently sketched by the user with a pause mark and saves the current sketch status including the sketch speed, and after the first virtual camera moves via the shortest route to get out of the bent domain, the first motion window module enables the user to resume sketching in the previously saved sketching status from the position indicated with the pause mark.

Then, it is determined whether a detailed route for the main route of the object will be inputted (S106).

Next, if the detailed route for the main route of the object is determined to be inputted, the second motion window module (103) successively creates a plurality of second motion windows passing through the main route inputted via the first motion window module (102) at the center thereof with an interval therebetween (S107) and provides the user with the third screen displaying the second motion windows via the second virtual camera, so that a detailed route of the object is inputted when the user sketches the detailed route of the object on the second motion windows using an input tool such as a tablet pen, a mouse and a touch input device (S108), and then the inputted detailed route of the object is approximated and stored before proceeding to the next step (S109). On the other hand, if the detailed route for the main route of the object is determined not to be inputted, the next step proceeds without receiving the detailed route for the main route of the object.

The uniform cubic B-spline interpolation method may be employed in sampling and approximating the detailed route.

The intervals between the plurality of the second motion windows created in the second motion window module are determined by the speed information inputted via the first motion window module (102).

That is, the second motion window module (103) displays the second motion windows on the third screen with a relatively large interval therebetween in the domains corresponding to high speeds in the main route inputted via the first motion window module (102), and displays the second motion windows on the third screen with a relatively short interval therebetween in the domains corresponding to low speeds.

The detailed route of the object sketched on the second motion windows means a detailed movement when the object makes such detailed movement (e.g., a spiral movement) around the main route while the object is moving along the main route.

In describing the present invention, an object without joints such as an airplane is exemplified as an object to be animated, but the invention is not limited thereto. The object to be animated may be an object with joints as long as it falls within the scope of the invention, and in case of an object having joints, the detailed route sketching unit (103a) of the second motion window module (103) may receive the detailed route of the object as well as information on the gesture and the height of the object from the user And when the second motion window module (103) receives the detailed route on the second motion window from the user, it monitors for every detailed route sketched on the second motion windows the tangent values between the detailed routes sketched on a predetermined number of the previous and subsequent successive second motion windows. When a reverse movement is detected, the detailed route causing the reverse movement is ignored (deleted). Hereby, even though the first motion windows are heavily bent so that some domains of the second motion windows are overlapped and the user sketches the detailed route on the overlapped domains, the second motion window module (103) recognizes the detailed route coincident with the intent of the user without errors.

Next, the animation implementation unit (104) performs a beautification process on a three-dimensional route according to the detailed route received from the second motion window module (103) or on a three-dimensional route according to the main route received from the first motion window module (102) (S109), and then implements an animation according to the beautified three-dimensional route (S110).

When the above object is an object with joints, the detailed route received from the second motion window module (103) as well as the information of the gesture and the height received from the first motion window module (102) or the second motion window module (103) are applied in implementing the animation.

Meanwhile, the embodiments of the present invention as described above can be prepared as programs executable on a computer and can be implemented on a general purpose digital computer capable of operating programs using computer-readable recording media. The computer-readable recording media include storage media such as magnetic storage media (e.g., ROM, floppy disk, hard disk, magnetic tape, etc.), optical reading media (e.g., CD-ROM, DVD, optical data storage devices, etc.) and carrier waves (e.g., transmission via internet).

Although explanatory embodiments have been shown and described, it would be appreciated by those skilled in the art that various changes, alterations, and substitutions can be made in the embodiments without departing from the spirit of the invention. Therefore, it shall be understood that the embodiments and the accompanying drawings are to illustrate the invention, and the scope and the spirit of the invention shall not be construed to be limited to these embodiments and the accompanying drawings. The scope of the invention may only be interpreted by the claims below, and the claims below and their equivalents will fall within the scope of the spirit of the invention.

What is claimed is:

1. An animation authoring method, comprising the steps of:
   (a) providing a first screen electronically displaying a reference plane to a user;
   (b) determining a plane route of an object on the reference plane according to a sketch of a line that the user makes on the first screen;
   (c) forming a motion window extending in a upward direction from the plane route on the reference plane, the motion window making an angle to the reference plane;
   (d) providing a second screen displaying the motion window to the user, a bottom line of the motion window on the second screen corresponding to the plane route;
   (e) receiving a sketch of a gesture for the object on the second screen;
   (f) determining gesture data of the object and corresponding parameters based on the sketch of the gesture;
   (g) determining a motion of the object in the motion window based on the gesture data of the object and corresponding parameters; and
   (h) implementing an animation based on the determined plane route and the determined motion,
   wherein a type of the motion of the object corresponds to a shape of the gesture.

2. The animation authoring method as claimed in claim 1, wherein the parameters include the speed or height of the object, and wherein the speed of the object corresponds to the speed of the user drawing the gesture and the height of the object corresponds to the height of the gesture.

3. The animation authoring method as claimed in claim 1, wherein step (g) comprises the step of displaying the gesture to the user via the second screen while a virtual camera moves along the motion window in the input direction of the gesture, maintaining a distance to the motion window.

4. The animation authoring method as claimed in claim 3, wherein, when the gesture gets out of the motion window, the virtual camera performs zoom out with respect to the second screen.

5. The animation authoring method as claimed in claim 3, wherein, when the input direction of the gesture is changed to the opposite direction, the virtual camera performs scrolling with respect to the second screen in the corresponding direction.

6. The animation authoring method as claimed in claim 1, wherein step (g) comprises the step of converting the gesture data into the corresponding one of pre-stored motion data.

7. The animation authoring method as claimed in claim 6, further comprising the step of:
   (g') after step (g) and before step (h), creating a motion sequence of the object by arranging the motion data and the corresponding parameters in a temporal manner.

8. The animation authoring method as claimed in claim 1, wherein step (g) comprises:
   (g1) partitioning the gesture data;
   (g2) determining whether the gesture data in each partition corresponds to predetermined motion data; and
   (g3) if it is determined that the gesture data corresponds to the predetermined motion data, converting the gesture data to the motion data, and if it is determined that the gesture data does not correspond to the predetermined motion data, converting the gesture data to pre-stored basic motion data.

9. The animation authoring method as claimed in claim 1, wherein the determined motion of the object in the motion window is a main route movement of the object in the motion window, and the method further comprising the step of:
   (g') after step (g) and before step (h), providing a third screen displaying a plurality of secondary motion windows passing through the main route and each formed with an interval therebetween, and determining detailed motions of the object in the plurality of secondary motion windows according to information on the detailed motions in the plurality of secondary motion windows that the user inputs via the third screen.

10. An animation authoring system, comprising:
a plane route module to provide a first screen displaying a reference plane to a user and determine a plane route of an object on the reference plane according to a sketch of a line that the user makes on the first screen;
a motion window module configured to:
  form a motion window extending in a upward direction from the plane route on the reference plane, the motion window making an angle to the reference plane;
  provide a second screen displaying the motion window to the user, a bottom line of the motion window on the second screen corresponding to the plane route;
  receive a sketch of a gesture for the object on the second screen;
  determine gesture data of the object and corresponding parameters based on the sketch of the gesture; and
  determine a motion of the object in the motion window based on the gesture data of the object and corresponding parameter; and
an animation implementation unit to implement an animation based on the determined plane route and the determined motion,
wherein a type of the motion of the object corresponds to a shape of the gesture.

11. The animation authoring system as claimed in claim 10, wherein the motion window module further displays the gesture to the user via the second screen while a virtual camera moves along the motion window in the input direction of the gesture, and maintains a distance to the motion window,
wherein, when the gesture gets out of the motion window, the virtual camera performs zoom out with respect to the second screen, and
wherein, when the input direction of the gesture is changed to the opposite direction, the virtual camera performs scrolling with respect to the second screen in the corresponding direction.

12. The animation authoring system as claimed in claim 10, wherein the motion window module further converts the gesture data into the corresponding one of pre-stored motion data and creates a motion sequence of the object by arranging the motion data and the corresponding parameters in a temporal manner.

13. The animation authoring system as claimed in claim 10, wherein the motion window module partitions the gesture data, determines whether the gesture data in each partition corresponds to predetermined motion data, and if it is determined that the gesture data corresponds to the predetermined motion data, converts the gesture data to the motion data, and if it is determined that the gesture data does not correspond to the predetermined motion data, converts the gesture data to pre-stored basic motion data.

14. The animation authoring system as claimed in claim 10, wherein the determined motion of the object in the motion window is a main route movement of the object in the motion window, and
wherein the motion window module provides a third screen displaying a plurality of secondary motion windows passing through the main route and each formed with an interval therebetween, and determining detailed motions of the object in the plurality of secondary motion windows according to information on the detailed motions in the plurality of secondary motion windows that the user inputs via the third screen.

15. A non-transitory computer readable medium storing computer readable instructions which, when executed by a computer system, perform an animation authoring method, the method comprising:
  (a) providing a first screen electronically displaying a reference plane to a user;
  (b) determining a plane route of an object on the reference plane according to a sketch of a line that the user makes on the first screen;
  (c) forming a motion window extending in a upward direction from the plane route on the reference plane, the motion window making an angle to the reference plane;
  (d) providing a second screen displaying the motion window to the user, a bottom line of the motion window on the second screen corresponding to the plane route;
  (e) receiving a sketch of a gesture for the object on the second screen;
  (f) determining gesture data of the object and corresponding parameters based on the sketch of the gesture;
  (g) determining a motion of the object in the motion window based on the gesture data of the object and corresponding parameter; and
  (h) implementing an animation based on the determined plane route and the determined motion,
wherein a type of the motion of the object corresponds to a shape of the gesture.

16. The non-transitory computer readable medium of claim 15, wherein step (g) comprises the step of displaying the gesture to the user via the second screen while a virtual camera moves along the motion window in the input direction of the gesture, maintaining a distance to the motion window
wherein, when the gesture gets out of the motion window, the virtual camera performs zoom out with respect to the second screen, and
wherein, when the input direction of the gesture is changed to the opposite direction, the virtual camera performs scrolling with respect to the second screen in the corresponding direction.

17. The non-transitory computer readable medium of claim 15, wherein step (g) comprises the step of converting the gesture data into the corresponding one of pre-stored motion data, and after step (g) and before step (h), creating a motion sequence of the object by arranging the motion data and the corresponding parameters in a temporal manner.

18. The non-transitory computer readable medium of claim 15, wherein step (g) comprises:
  (g1) partitioning the gesture data;
  (g2) determining whether the gesture data in each partition corresponds to predetermined motion data; and
  (g3) if it is determined that the gesture data corresponds to the predetermined motion data, converting the gesture data to the motion data, and if it is determined that the gesture data does not correspond to the predetermined motion data, converting the gesture data to pre-stored basic motion data.

* * * * *